(12) United States Patent
Sivertsen

(10) Patent No.: US 8,006,105 B1
(45) Date of Patent: Aug. 23, 2011

(54) AC-POWERED IN-WALL COMPUTING DEVICE WITH POWER-LINE NETWORKING CAPABILITIES

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 811 days.

(21) Appl. No.: 11/517,975

(22) Filed: Sep. 8, 2006

Related U.S. Application Data

(63) Continuation-in-part of application No. 11/498,295, filed on Aug. 2, 2006.

(51) Int. Cl.
*G06F 1/00* (2006.01)
*G06F 1/16* (2006.01)
*H01R 13/46* (2006.01)
*H05K 5/00* (2006.01)
*H01H 9/02* (2006.01)
*H01H 13/04* (2006.01)
*H01H 19/04* (2006.01)
*H01H 21/04* (2006.01)
*H01H 23/04* (2006.01)
*H02G 3/08* (2006.01)
*G05B 19/18* (2006.01)

(52) U.S. Cl. ............ 713/300; 174/520; 174/53; 174/58; 220/3.5; 361/679.02; 700/56

(58) Field of Classification Search .................. 713/300; 345/173; 340/686.6, 686.1; 174/50, 520, 174/53, 58; 361/600, 679.01, 679.02; 220/3.2, 220/3.5, 4.02; 700/56
See application file for complete search history.

(56) References Cited

U.S. PATENT DOCUMENTS

| | | | | |
|---|---|---|---|---|
| 6,104,451 | A * | 8/2000 | Matsuoka et al. | 349/58 |
| 6,246,573 | B1 * | 6/2001 | Khan et al. | 361/679.55 |
| 6,798,341 | B1 * | 9/2004 | Eckel et al. | 340/521 |
| 6,967,565 | B2 * | 11/2005 | Lingemann | 340/310.11 |
| 7,394,451 | B1 * | 7/2008 | Patten et al. | 361/679.41 |
| 7,522,065 | B2 * | 4/2009 | Falcon | 340/686.6 |
| 7,608,948 | B2 * | 10/2009 | Nearhoof et al. | 307/140 |
| 2002/0021288 | A1 * | 2/2002 | Schug | 345/169 |

(Continued)

OTHER PUBLICATIONS

U.S. Official Action dated Jun. 10, 2009 in U.S. Appl. No. 11/498,295.

*Primary Examiner* — Thomas Lee
*Assistant Examiner* — Brandon Kinsey
(74) *Attorney, Agent, or Firm* — Morris Manning & Martin, LLP; Tim Tingkang Xia, Esq.

(57) ABSTRACT

Apparatus and systems provide processing capabilities and power-line networking capabilities. An in-wall computing device has a power connector for receiving an Alternating Current (AC) signal from a power source and a housing that is sized for installation into an electrical wall box. The device may have internal data injection circuitry for injecting data into the AC signal or may have internal data receiving circuitry for extracting data from the AC signal. A system includes at least two in-wall computing devices, each having a power connector for receiving an AC signal from a power source. A first device has a user input interface and internal data injection circuitry for transmitting user input data to a second device over the AC signal. The second device has internal data receiving circuitry for extracting the user input data and controlling peripherals attached to peripheral ports of the device according to the data.

19 Claims, 11 Drawing Sheets

U.S. PATENT DOCUMENTS

| | | | |
|---|---|---|---|
| 2005/0110740 A1* | 5/2005 | Linzmeier et al. | 345/102 |
| 2005/0125083 A1* | 6/2005 | Kiko | 700/19 |
| 2005/0264981 A1* | 12/2005 | Anderson et al. | 361/679 |
| 2006/0185876 A1* | 8/2006 | Aviv | 174/50 |
| 2006/0185877 A1 | 8/2006 | Soffer | |
| 2007/0256105 A1* | 11/2007 | Tabe | 725/78 |
| 2007/0263855 A1* | 11/2007 | Martich et al. | 379/413.04 |
| 2008/0218493 A1* | 9/2008 | Patten et al. | 345/173 |

* cited by examiner

AC-POWERED IN-WALL COMPUTING DEVICE WITH POWER-LINE NETWORKING CAPABILITIES

CROSS-REFERENCE TO RELATED APPLICATIONS

This is a continuation-in-part of U.S. application Ser. No. 11/498,295, entitled "Ethernet Powered Computer Device and System," filed Aug. 2, 2006, which is incorporated by reference herein in its entirety.

TECHNICAL FIELD

The present invention relates generally to the field of computing devices as related to power systems, networking, and configurations. More specifically, the disclosure presented herein relates to the field of utilizing power-line power supply and networking capabilities within a wall-mounted computing device.

BACKGROUND

Personal and embedded computers today exist in a variety of common form-factors, such as standard towers, desktops, racks, and laptops of various sizes. Computer motherboards and embedded systems are also available as bare circuit board assemblies in some typical form factors such as ATX and PC-104. These systems commonly require an external power adapter or a power supply to operate. Conventional Personal Computers and Embedded systems require a variety of voltages supplied to power the various parts of a product, such as +/−12V, 5V, 3.3V, 1.8V, and 1.5V. These voltages are typically provided by a power supply external to the main circuit board of the product, which takes up space, requires additional cabling and generates heat.

Computer systems are often linked together to provide networked communications. One such method for linking computer systems is to use Ethernet. As a result, many computers and embedded systems are outfitted with Ethernet ports. These ports typically consist of one or more 8-pin RJ-45 connectors. Consequently, most computer systems require an external power supply, a LAN cable for Ethernet connectivity, and desk, floor, or rack space to accommodate the physical computing device.

It is with respect to these and other considerations that the various embodiments described herein have been made.

SUMMARY

In homes and businesses it is common to use electrical boxes in walls, ceilings and exteriors. These boxes come in a variety of mounting styles depending on where and how they are installed and what connections they need to make. Often referred to as "gang-boxes", these devices typically come in a standard height, and a variety of depths and widths. Gang-boxes are available in a number or integer combinations, where a single gang can host one computing device, a double-gang can host two computing devices, a triple-gang can host three computing devices, and so forth. This is a useful and flexible way of combining controlling devices such as light switches, dimmers, wall-outlets, and other computing devices.

According to one embodiment described herein, an in-wall computing device provides processing capabilities and power-line networking capabilities. The in-wall computing device includes a Central Processing Unit (CPU), a power connector, internal data injection circuitry, and a housing. The power connector is operative to receive an Alternating Current (AC) signal from a power source on an electrical circuit. The internal data injection circuitry is operative to receive outgoing data from the CPU and to inject the outgoing data into the AC signal. The housing encompasses the CPU, the power connector, and the internal data injection circuitry and is sized for installation within an electrical wall box. According to one implementation, the in-wall computing device has internal data receiving circuitry operative to extract incoming data from the AC signal and to supply the extracted incoming data to the CPU. The internal data receiving circuitry may include a voltage limiter and an analog-to-digital converter. The internal data injection circuitry may include a digital-to-analog converter and a power injector.

According to one implementation, the in-wall computing device has a user interface for receiving user commands. The internal data injection circuitry is operative to translate the user commands into an analog signal compatible for injection into the AC signal and to inject the translated user commands into the AC signal for transmission to a receiving computing device on the electrical circuit. The user interface may include a touch sensitive display unit. The in-wall computing device may further include internal power supply circuitry that is operative to receive the AC signal from the power connector, to convert the AC signal into a Direct Current (DC) signal, and to supply the DC signal to the CPU. The in-wall computing device may alternatively have an Ethernet connector for receiving power and for communicating with networked computing devices.

According to a further embodiment described herein, an in-wall computing device provides processing capabilities and power-line networking capabilities utilizing a CPU, a power connector, internal data receiving circuitry, and a housing. The power connector is operative to receive an AC signal from a power source. The internal data receiving circuitry is operative to extract incoming data from the AC signal and to supply the incoming data to the CPU. The housing encompasses the CPU, the power connector, and the internal data receiving circuitry and is sized for installation within an electrical wall box. According to one implementation, the in-wall computing device has internal data injection circuitry operative to receive outgoing data from the CPU and to inject the outgoing data into the AC signal. The internal data injection circuitry may include a digital-to-analog converter and a power injector. The internal data receiving circuitry may include a voltage limiter and an analog-to-digital converter.

According to one implementation, the in-wall computing device has one or more peripheral ports for connection to one or more peripherals. The peripheral ports may be exposed in the housing and accessible from the front side of the in-wall computing device when installed within the electrical wall box. The in-wall computing device may further include internal power supply circuitry that is operative to receive the AC signal from the power connector, to convert the AC signal into a DC signal, and to supply the DC signal to the CPU.

According to yet another implementation described herein, a system is provided for controlling peripheral devices. The system includes two in-wall computing devices. The first in-wall computing device includes a user input interface, a CPU, a power connector, internal data injection circuitry, and a housing. The power connector is operative to receive an AC signal from a power source on an electrical circuit. The CPU is operative to receive data from the user input interface. The internal data injection circuitry is operative to receive the data from the CPU and to inject the data into the AC signal for transmission to the second in-wall computing device. The housing encompasses the user input interface, the CPU, the power connector, and the internal data injection circuitry, and is sized for installation into an electrical wall box.

The second in-wall computing device includes a power connector, internal data receiving circuitry, a CPU, and a housing. The power connector is operative to receive the AC signal from the power source on the electrical circuit. The internal data receiving circuitry is operative to extract the data transmitted within the AC signal from the first in-wall computing device and to supply the data to the CPU. The CPU is operative to receive the data and to transmit instructions corresponding to the data to one or more peripheral ports for transmission to one or more peripherals. The housing encompasses the CPU, the power connector, the internal data receiving circuitry, and the peripheral ports, and is sized for installation within an electrical wall box. According to one implementation, each in-wall computing device has an Ethernet connector operative to receive power and data independently of the power connector.

These and various other features as well as advantages, which characterize the disclosure presented herein, will be apparent from a reading of the following detailed description and a review of the associated drawings. It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
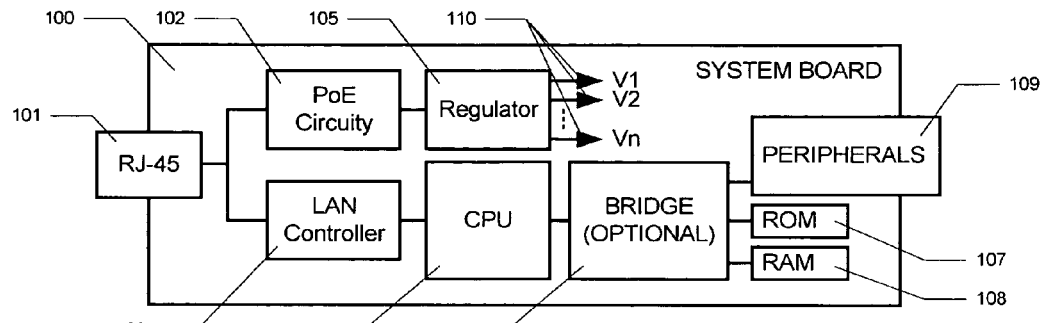
FIG. 1 is a block diagram of a computing device powered through the Ethernet connector according to one embodiment disclosed herein.

The following detailed description is directed to apparatus and systems for processing capabilities and power-line networking capabilities. In the following detailed description, references are made to the accompanying drawings that form a part hereof, and which are shown by way of illustration specific embodiments or examples. Referring now to the drawings, in which like numerals represent like elements through the several figures, aspects of the methods and computer-readable media provided herein will be described.

Referring now to FIG. 1, the block diagram of a computing device 100 is shown according to one embodiment. Although the block diagram is simplified and contains blocks that could be combined, it should be understood that blocks could be further combined and expanded while maintaining the advantageous features of the computing device. As this description intends to simplify the disclosure for clarity, those skilled in the art would appreciate that the product could be enhanced with additional blocks and peripherals without changing the fundamental advantages of the embodiments presented herein.

The computing device shown in FIG. 1 contains an RJ-45 modular jack connector 101, typically found in Ethernet products, such as computers and network hubs. This connector typically has a built in transformer consisting of a magnetic core with separate windings for each conductor pair. The PoE circuitry 102 is connected to unused pairs of the connector 101, and/or used pairs depending on the method used for carrying power over the Ethernet cable. The circuitry 102 may contain protection elements for voltage spikes, power conditioning, and rectification of voltage. The circuitry 102 may also contain isolation circuitry including a transformer, voltage regulation components and current limiting and over-current protection components.

The Regulator 105, contains one or more semiconductor components necessary to change the voltage outputted by the PoE circuitry 102 to voltages suitable for the various components of the system board 100. Typical voltages needed to drive common electronic components such as Random Access Memory (RAM) 108, Read Only Memory (ROM) 107, the CPU 104, the LAN Controller 103 and other peripherals 109 are 5V, 3.3V, 1.8V and 1.5V, but other custom voltages could be needed i.e., a negative voltage to drive an LCD display (not shown).

The CPU 104 is the main controller for the product and could be an X86 processor, such as the INTEL i386, i486, PENTIUM I, PENTIUM II, PENTIUM III, PENTIUM IV, PENTIUM V, processors from AMCC such as the EP405, HITACHI SH3 and SH4, processors from MOTOROLA such as COLDFIRE, INTEL XSCALE, POWERQUICC from FREESCALE SEMICONDUCTOR, or other similar processors. The LAN controller 103 contains the necessary interface to drive and receive signals from the network, and communicate these to the rest of the system through the CPU 104. The Bridge 106, is optional depending on architecture and is often required as a transitional component between the CPU and other peripherals, particularly in INTEL architectures.

The ROM 107 may be a flash-ROM, EEPROM, or other non-volatile semiconductor component where the main program and data is stored. The RAM 108 is used by the CPU 105 for temporary storage of data or executable code for faster access as compared to the ROM 107. The peripherals block 109 contains conventional interface components such as serial, parallel, USB, FIREWIRE ports, components to interface displays, user input devices, and wireless communications devices. It should be understood that the devices described herein may also have wireless connectivity to a network or other wireless device through a built in antenna, an antenna embedded as circuit board traces, an external port for attaching an antenna or an antenna directly attached to the product. This wireless connectivity could be BLUETOOTH, WIFI, Wireless USB, Universal Wide Band, ZIGBEE, or other wireless standards.

Figure 2:
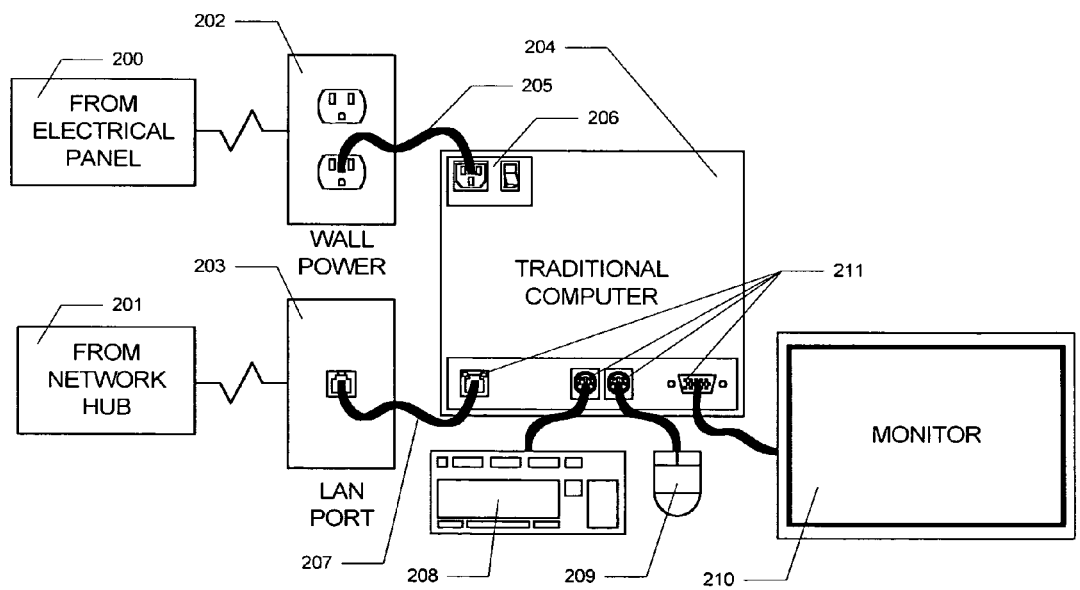
FIG. 2 is a connection diagram illustrating how a computer traditionally is connected to power, network, and peripherals.

FIG. 2 shows the prior art, where a conventional computer 204 with typical connections such as power 205 from the power supply 206 to wall power 202, which ultimately comes from the electrical panel 200, Ethernet 207 from the peripheral ports 211 going to a wall plate 203 and ultimately going to a network hub 201, connections to keyboard 208, mouse 209, and a local monitor 210.

Figure 3:
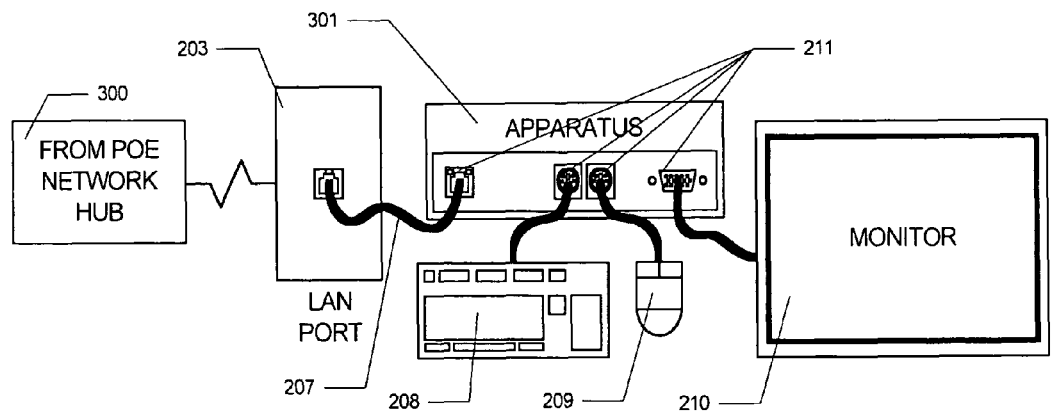
FIG. 3 is a connection diagram illustrating a computing device powered through Ethernet and connected to peripherals according to one embodiment presented herein.

FIG. 3 shows one embodiment where the computing device 301 described herein is connected through its peripheral ports 211 to an Ethernet wall plate 203 through a LAN cable 207, to a keyboard 208, to a mouse 209, and to a local monitor 210. The power for the computing device 211 is derived through the LAN cable 207, which is ultimately connected to a network hub 300 capable of supplying power to the computing device 211 through the LAN cable 207. Notice that there is no connection for power to the computing device from an external power source other than the Ethernet port. It should be appreciated that the computing device 301 may include a battery for use when the power supplied to the computing device via the LAN cable 207 is interrupted. The battery may receive its charge via the LAN cable 207 until power is interrupted, at which time the battery may provide the power required by the computing device 301 to the corresponding components.

Figure 4:
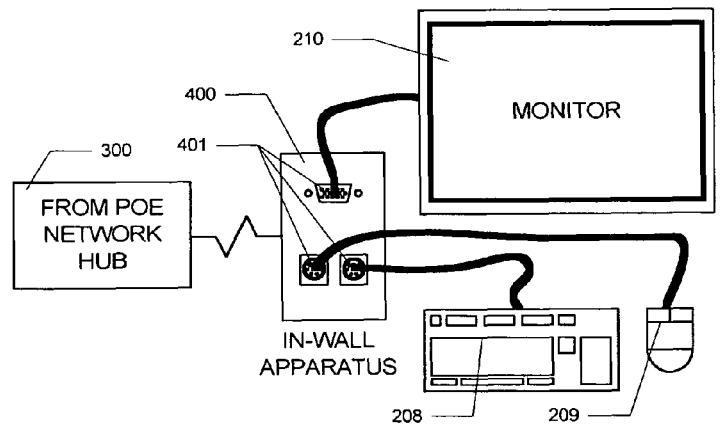
FIG. 4 is a connection diagram illustrating a computing device installed into a electrical wall box, powered through Ethernet, and connected to peripherals according to one embodiment presented herein.

FIG. 4 shows one implementation wherein the computing device 400 is enclosed and built into an electrical wall box, or gang-box. Peripheral connections 401 are available through the wall plate for connections to an external monitor 210 or other display device, such as a TV or flat-panel TV, a keyboard 208, a pointing device, such as a mouse 209. In this particular embodiment the network connection, ultimately going to a power delivery capable hub 300, is done through the back of the computing device.

By comparing FIG. 2 (prior art) and FIG. 4, the simplicity, aesthetics, reduction of cabling and equipment visible would be appreciated by consumers as well as those skilled in the art. Although FIG. 2 illustrates connections to Human Input Devices (HIDs) such as a keyboard 208 and a mouse 209, these devices could be easily be replaced with existing products that are wireless, such as remote controls and wireless HIDs further enhancing the visual and practical appeal of this implementation. The connections to a typical PC before the disclosure presented herein would take up two gang-box spaces, one for the Ethernet port and one for power. With the embodiments described herein, the PC could be built into a unit that installs into the wall box itself, and space, cabling, cost, and power is saved, which also increases its aesthetic appeal and usefulness in smaller applications.

Figure 5A:
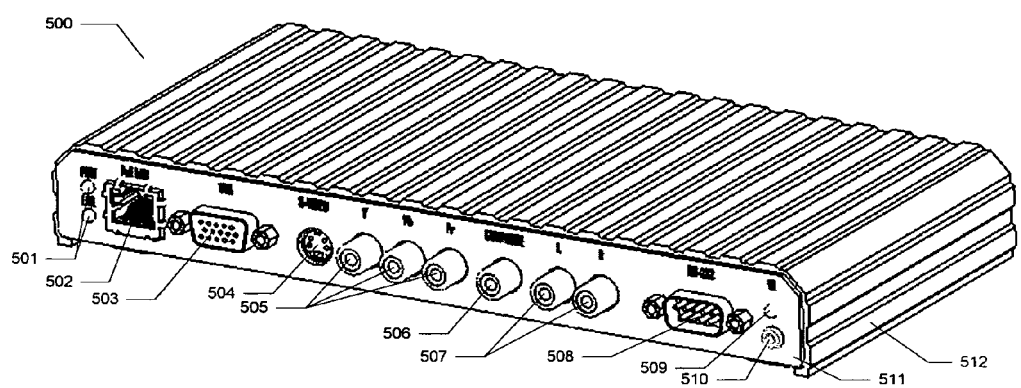
FIGS. 5a and 5b shows isometric and front views of a computing device equipped with IO ports targeting video and audio streaming applications according to one embodiment presented herein.
Figure 5B:
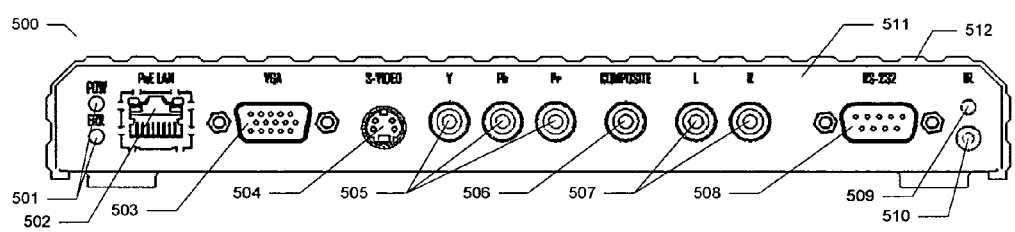

FIGS. 5*a* and 5*b* shows respectively isometric views and a front view of one particular implementation in which the computing device 500 is targeting an audio/video distribution application, as could be found in a future home where a central media server is providing multimedia content to devices throughout the residence using powered Ethernet cables. This device 500 would then reside near a display and audio equipment such as a TV with built in speakers, and would be directly connected to this equipment through its peripheral ports. This particular mode of the embodiment is shown as to sheet metal halves 511 and 512 that are assembled and fastened around a circuit board, internal to the enclosure formed by the top housing 512 and the bottom housing 511. It should be understood that the enclosure of this embodiment could be sheet metal, extruded aluminum, plastic, or any other material. Additionally, it should be appreciated that since not all Ethernet ports provide power, the computing device could additionally have a traditional power adapter, wall adapter input or internal power supply.

Light Emitting Diodes (LEDs) 501 indicates the operational status of the device, the LAN port 502 is the connection to Ethernet and power source for the device according to the disclosure presented herein. The device 500 could have the same input and output ports as typically found on a PC, such as connector for video output (VGA), serial ports, parallel ports, keyboard and mouse (PS/2), USB, and audio connectors. Additionally the device 500 may have ports not commonly found on PCs such as a composite video output, component video output, infrared port, and direct output to speakers. The composite/component video and direct speaker outputs are useful in multimedia installations where the device is used as part of an audio/video distribution system.

The embodiment shown in FIGS. 5*a* and 5*b* show a variety of parallel video outputs so that one particular product realized from this disclosure could be used in a variety of installations, such as instances where the computing device drives a VGA-monitor through the VGA-connector 503, a flat-panel LCD-TV through is S-Video port 504, a home theater video projector through its component video connectors 505, or conventional TV through its composite video connector 506. Note that one or more of these video outputs could be used simultaneously. Connections to an audio system are made through line RCA-jacks 507. Since many video display products also contain speakers, a connection would typically be made from the computing device to both video and audio inputs of a device, such as a TV with built in speakers. The computing device described herein features ports to control functions of the device to which they are connected through standard interface methods. In particular these are an RS-232 serial port 508, often found on high-end plasma screen TVs, an Infra Red (IR) LED 509 to send command to devices capable of being controlled with conventional remote controls, and a connector for connecting an external IR-LED in those cases where the built in LED 509 cannot provide a visibly direct path to the equipped it is intended to control.

Figure 6A:
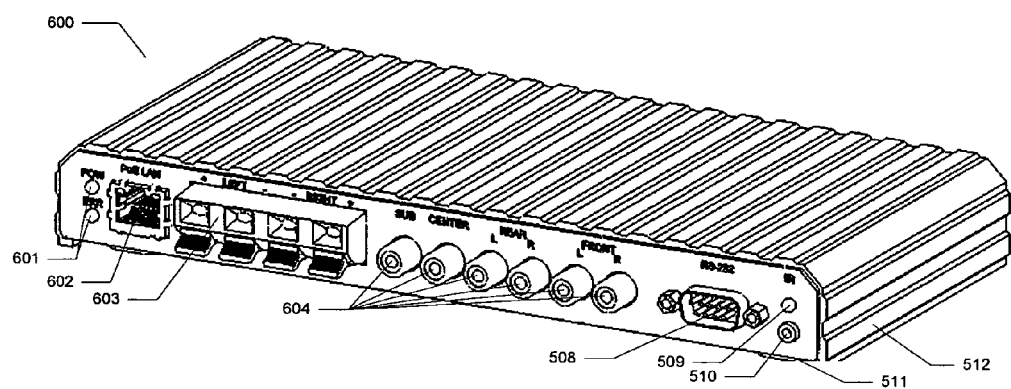
FIGS. 6a and 6b shows isometric and front views of a computing device equipped with IO ports targeting surround audio streaming applications according to one embodiment presented herein.
Figure 6B:
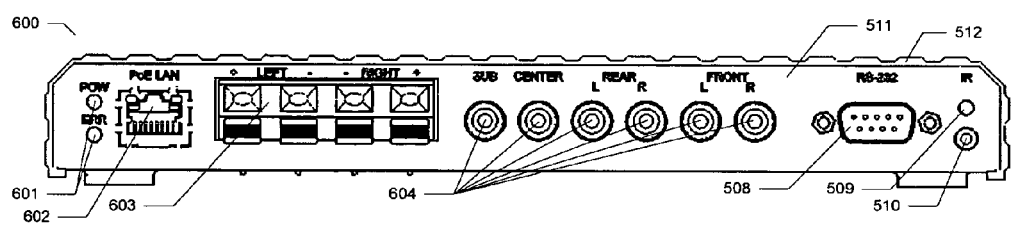

FIGS. 6*a* and 6*b* shows respectively isometric views and front view of one implementation in which the computing device 600 is targeting an audio application, as could be found in a future home where a central media server is providing audio content to devices throughout the residence using powered Ethernet cables. This device 600 would then reside near the audio equipment such as an amplifier, a speaker, or a pair of speakers, and would be directly connected to this equipment through its peripheral ports. This particular mode of the embodiment is shown as to sheet metal halves 511 and 512 that are assembled and fastened around a circuit board, internal to the enclosure formed by the top housing 512 and the bottom housing 511. LEDs 601 indicate the operational status of the device, the LAN port 602 is the connection to Ethernet and power source for the device. The embodiment shows a variety of parallel audio outputs so that one particular product realized based on this invention could be used in a variety of installations, such as instances where the computing device drives a pair of stereo speakers directly through quick release connectors 603, a home theater audio surround system through the stereo front, stereo rear, and center and sub connectors 604. Note that one or more of these audio outputs could be used simultaneously. The computing device described herein features ports to control functions of the device to which they are connected through standard interface methods.

Figure 7A:
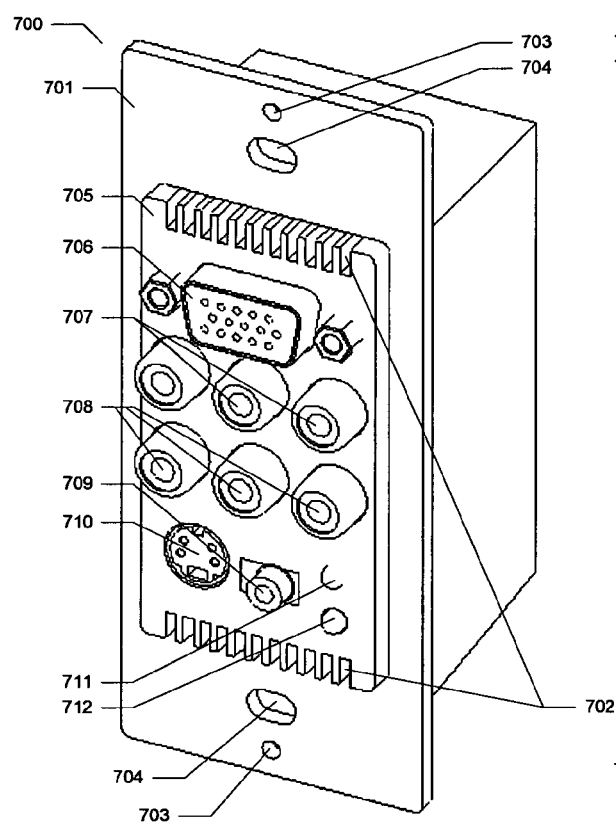
FIGS. 7a and 7b illustrate front and rear isometric views of a computing device showing installation of the device into an electrical wall box according to one embodiment presented herein.
Figure 7B:
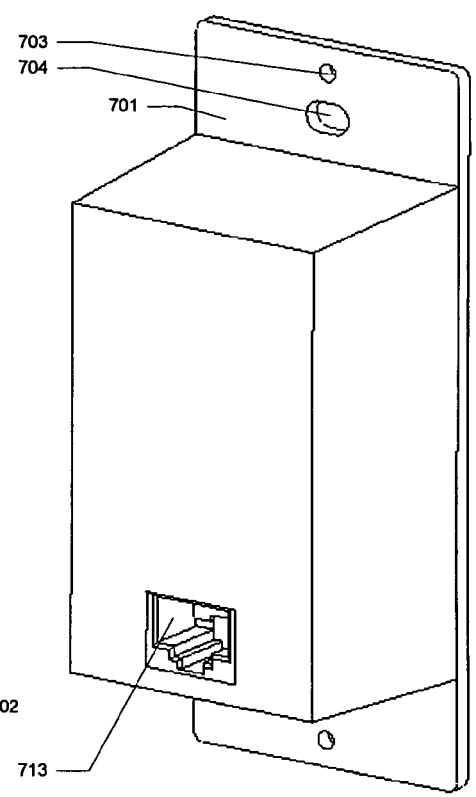

FIGS. 7*a* and 7*b* show isometric front and rear views of one embodiment wherein the computing device 700 may be connected to any number of peripherals. A housing is shown consisting of a mountable front plate 701 with a housing compartment for containing the electronics, and a protruding portion 705 that is designed to fit conventional wall plates, often referred to a Decora-style wall plates. In this particular installation mode, peripheral connectors are shown for VGA 706, component video 707, composite video and stereo audio 708, and S-Video 710. A built in IR-LED 711 in parallel with a connector 709 can be used to control external equipment. An additional LED 712 is used for status indication of the computing device. A LAN-port 713 is found on the back of the computing device and provides both power and network connectivity to the computing device. When the computing device is installed into an electrical wall box, it is secured by installing screws through openings 704 in the housing front plate 701.

After installation, a wall plate can be installed over the product covering up the screws that fasten the product to the wall box. The wall plate is mounted with cosmetic screws or snap-in hardware through holes 703. In the protruding part of the housing 705 there may be ventilation ridges 702 that are openings at the top and bottom of the protrusion where airflow can circulate through to cool internal components. It should be appreciated that prior to the disclosure provided herein, PCs could still be mounted on walls and in ceilings using brackets, and then connected to its peripherals. However, with this particular embodiment, the PC resides inside the wall box itself, and peripherals are terminated to connectors protruding the cover pate of the wall box.

Figure 8:
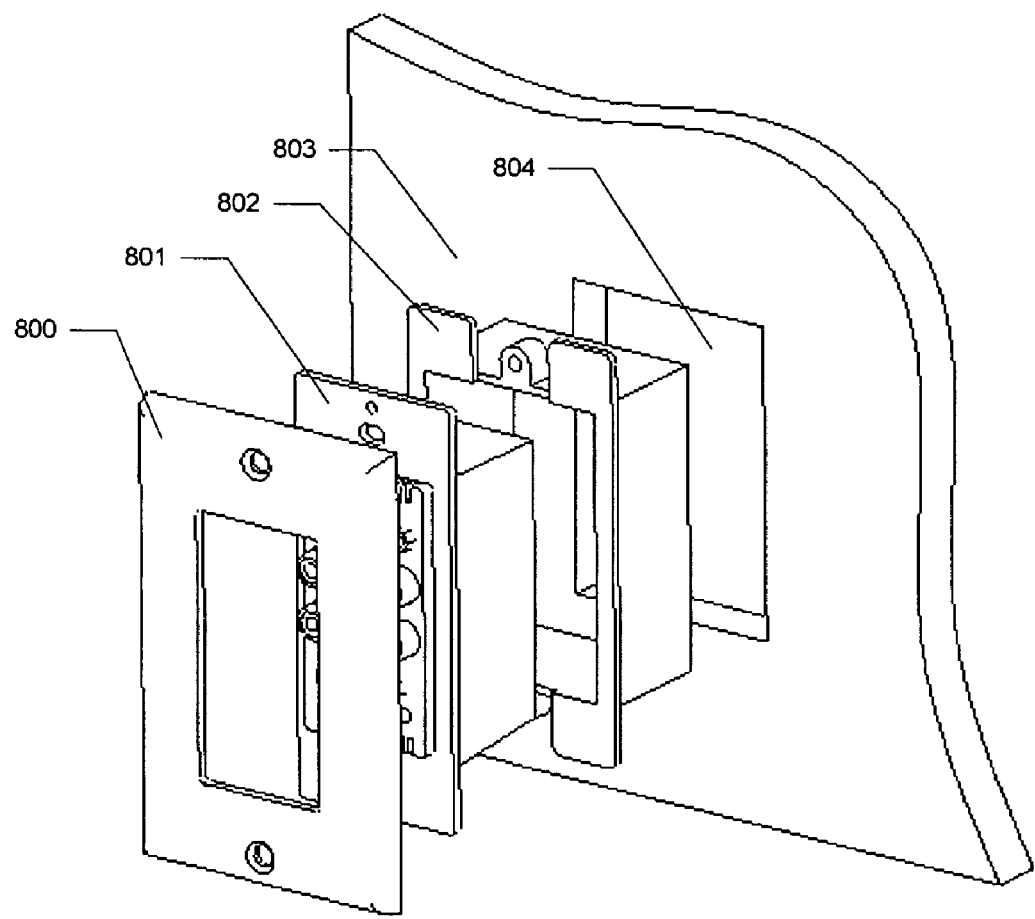
FIG. 8 is an exploded view of a computing device installed into an electrical wall box within drywall and outfitted with a standard wall plate according to one embodiment presented herein.

FIG. 8 illustrates how one implementation 801 could be installed in a typical wall installation. A hole 804 is cut-out in the drywall 803 and an electrical wall box 802 is installed through the opening, and secured to the drywall with anchors typically included as part of the wall box accessories. The computing device described herein 801 is installed into the electrical box with screws or snap-in fasteners. Then, a finishing wall plate 800 is finally installed and secured to the computing device with screws of snap-in fasteners.

The particular mode of installation showing the computing device used in a single electrical wall box is done for simplicity of illustration only. The computing device shown could equally well be installed in electrical wall boxes targeted for any number of integer units, such as the computing device installed in a double or triple wall box, where one or two open cavities are available for other equipment or more instances of the computing device.

Figure 9A:
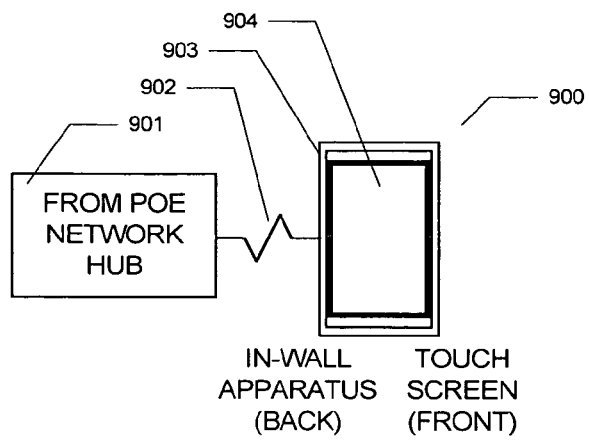
FIG. 9a shows an illustration of the computing device as seen in FIG. 4, but with the monitor, keyboard and mouse replaced by a touch panel mounted over the computing device according to one embodiment presented herein.

FIG. 9*a* shows an illustration of another embodiment 900, similar to the concept from FIG. 4, but where the monitor 210, keyboard 208 and mouse 209 has been replaced with a touch panel 904 and mounted over the computing device 903. A network connection also carrying power 902 ultimately connects the computing device to a network hub 901.

Figures 9B, 9C:
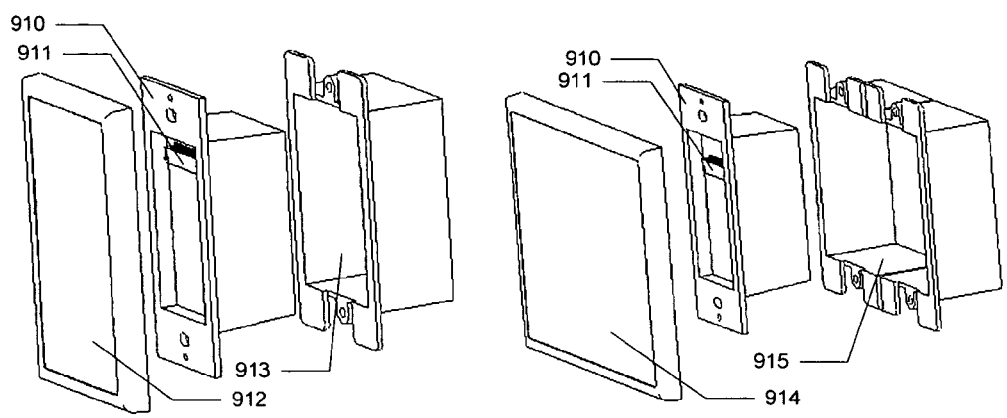
FIGS. 9b and 9c show exploded views of the computing device shown in FIG. 9a installed in a single and double electrical wall box respectively according to embodiments presented herein.

FIGS. 9*b* and 9*c* shows the same embodiment as from FIG. 9*a* in two exploded views, where the computing device 910 is installed into single 913 or double 915 electrical wall boxes respectively. The computing device 910 is outfitted with a connector 911 that connects to the single touch panel 912 or double touch panel 914 through a cable (not shown). This allows for easy installation and removal. The computing device is installed and secured into the wall box with screws or snap-in fasteners. The touch panel is then mounted onto the computing device with matching snap-in features on the panel and computing device. Using snap-in features, as opposed to screws, allows for quicker install, increases the visible area on the display, and improves the aesthetics of the product by now showing the screw heads. Additionally, the touch panel 904 may include a backlight for viewing in reduced light environments. The backlight may be varied in color and intensity to allow for the computing device 910 to function as a nightlight. The CPU receives control requests for the backlight through the touch panel 904 and alters the power to one or more lights that create the backlight in order to control the intensity and color according to the user request.

According to an additional embodiment, a computing device may include a motion sensor connected to the CPU. When movement is detected at a certain proximity from the computing device, the motion sensor may trigger the CPU to execute a stored instruction. This and other instructions may be stored within memory associated with the computing device. Various instructions may exist for various proximities. For example, if the computing device detects that a user walks within a certain distance, lights will be turned on. As the user gets closer, the stereo or television may be turned on.

It is important to realize that embodiments described herein may span a multiple of wall box cavities, allowing more room for peripheral connections, more room internally for circuitry, and improving the area available for the display. It should be appreciated that a series of product combinations could be developed where customers could mix and match units across multiple wall boxes to achieve particularly useful applications. One such combination of multiple embodiments could be an installation in a room where on one wall a computing device with a display is installed in a single wall box. In the same room, another wall box could be installed behind a TV containing another computing device with video outputs. In the same room, a third wall box could be installed in the ceiling with audio outputs connected to speakers directly. The system could then be programmed in such a way that the three computing devices communicate over the Ethernet to produce video and audio based on the interaction with the touch panel.

Figure 10A:
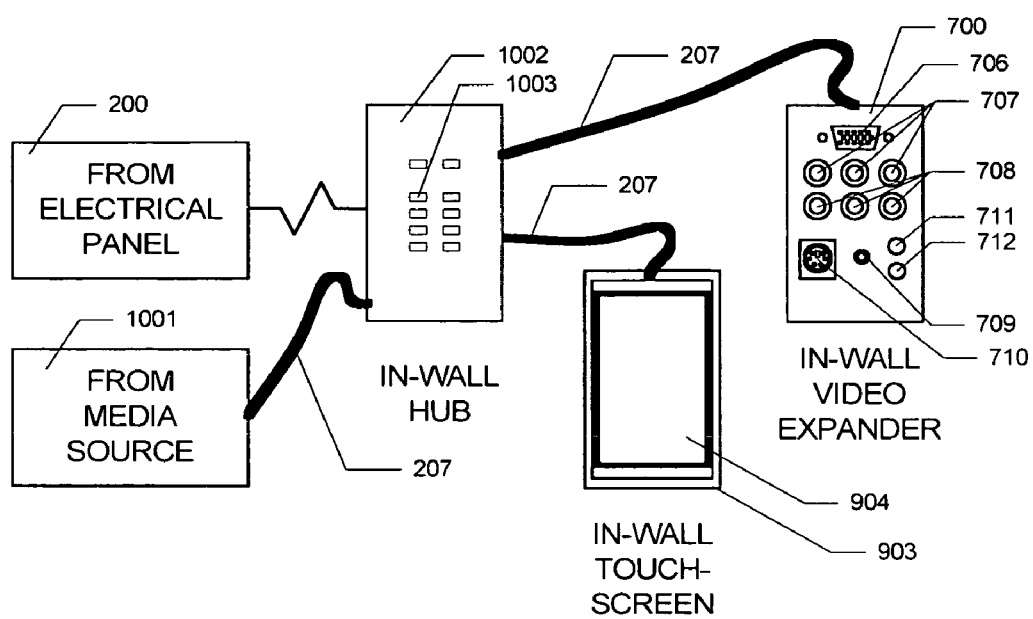
FIG. 10a illustrates a computing device network utilizing power over Ethernet circuitry according to one embodiment presented herein.
Figure 10B:
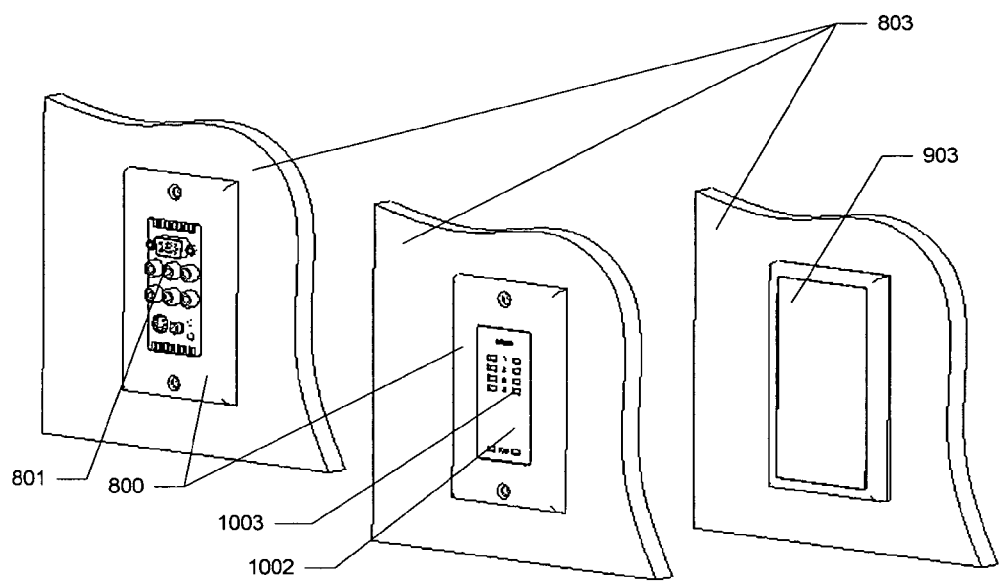
FIGS. 10b and 10c illustrate front and rear views respectively of the computing device network of FIG. 10a when mounted within a wall according to one embodiment presented herein.
Figure 10C:
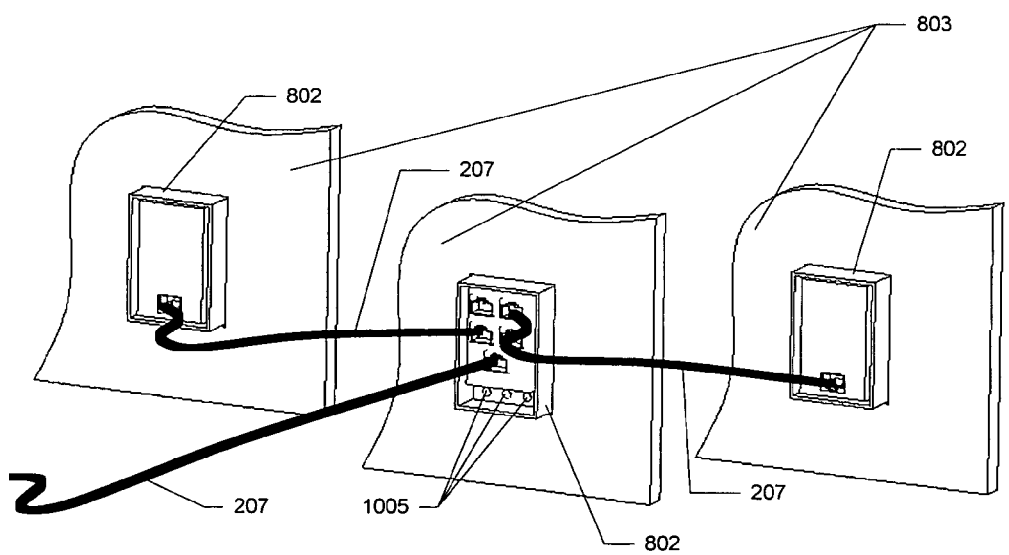

FIGS. 10*a*-10*c* show an implementation in which a computing device 903 with a touch panel 904 attached is used to control peripherals that are attached to the computing device 700. According to this implementation, the computing device 903 communicates with the computing device 700 via an in-wall Ethernet hub 1002 and LAN cables 207. The Ethernet hub 1002 may include LEDs 1003 for indicating connection status of various Ethernet ports located on the rear of the hub. The Ethernet hub 1002 may receive power from an electrical panel 200 and may be connected to a media source 1001. Utilizing the touch panel 904 in one room of a house, a user may instruct the computing device 700 in another room of a house to play media content from the media source 1001 using peripherals, such as speakers and a display, that are attached to the computing device 700 via any number and type of peripheral connectors.

FIGS. 10b and 10c show front and rear views of the computing devices 700 and 903. As can be seen in FIG. 10b, the computing devices 700 and 903, as well as the Ethernet hub 1002, are flush mounted within drywall 803. Cover plates 800 cover the computing device 700 and Ethernet hub 1002. FIG. 10c shows a rear view of the computing devices 700 and 903 and the Ethernet hub 1002. Power connections 1005 are shown as screw terminals for providing power to the in-wall Ethernet hub 1002. It can be seen that the computing devices 700 and 903 are mounted within electrical wall boxes 802 and are communicatively linked via LAN cables 207.

Figure 11:
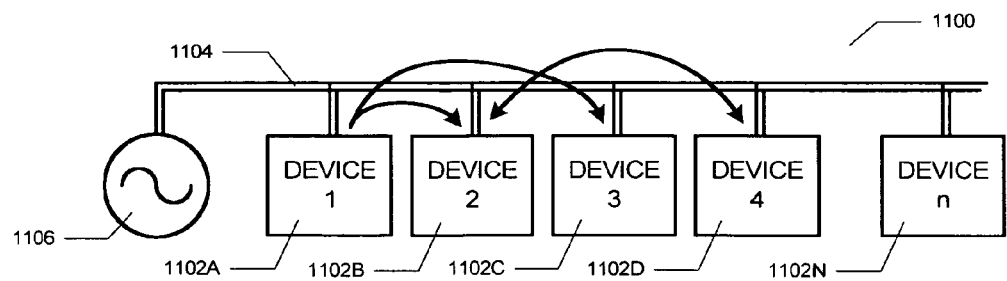
FIG. 11 illustrates a network of computing devices utilizing an electrical circuit for power and data transmission according to one embodiment presented herein.

FIG. 11 shows one implementation in which multiple computing devices 1102A-1102N form a computing device network 1100 utilizing an electrical circuit 1104 powered by a power source 1106. Arrows show the computing devices 1102A-1102N communicating with one another over the electrical circuit 1104. It should be appreciated that any of the computing devices 1102A-1102N may communicate with any other computing device connected to the electrical circuit 1104 even though for simplicity, only arrows showing communications from the computing device 1102A to computing devices 1102B and 1102C, as well as communications between computing devices 1102B and 1102D, are shown. The electrical circuit 1104 includes the power source 1106 for supplying Alternating Current (AC) to the computing devices 1102A-1102N. The power source 1106 supplies 110 V or 240V from a utility company as is commonly used in a residential or commercial facility. It should be appreciated that the power source 1106 may alternatively include any source of AC at any voltage.

Figure 12:
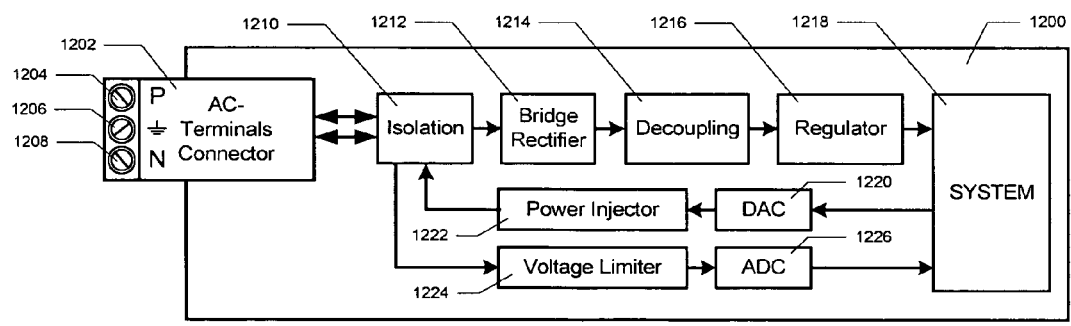
FIG. 12 is a block diagram of a computing device configured to receive and transmit data over a power-line according to one embodiment presented herein.
Figure 13:
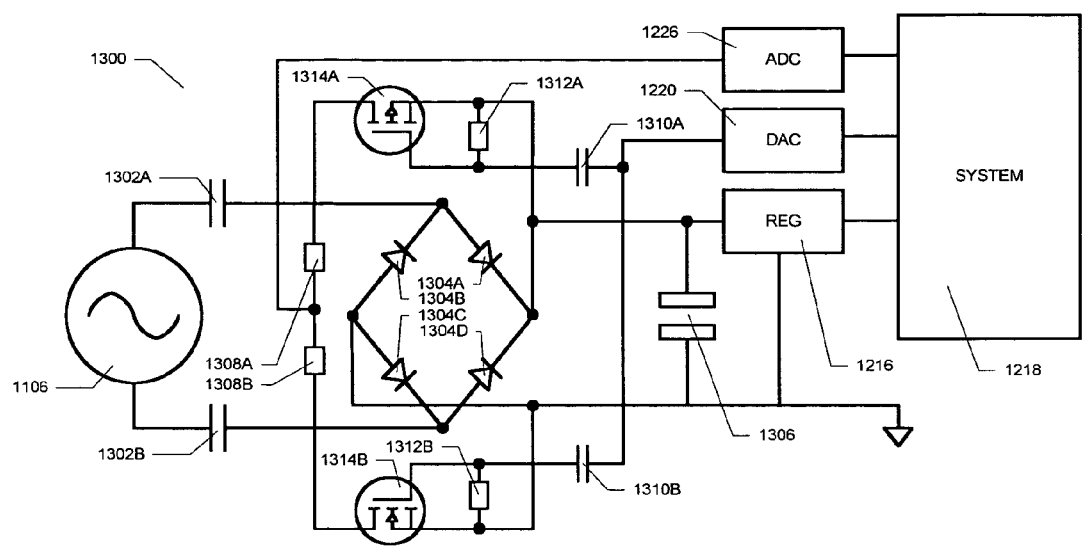
FIG. 13 is a circuit diagram of a computing device configured to receive and transmit data over a power-line according to one embodiment presented herein.

The implementations shown in FIG. 11 and described in detail below with respect to FIGS. 12 and 13 operate in a manner similar to the implementation described above with respect to FIG. 10 in which a computing device with a touch panel or other user input interface is used to control peripherals that are attached to one or more additional computing devices. A difference with the implementations shown in FIG. 11 and described in detail below with respect to FIGS. 12 and 13 is that the computing devices 1102A-1102N are powered by the electrical circuit 1104 and send and receive data via the electrical circuit 1104 rather than an Ethernet network. The computing devices 1102A-1102N may additionally include the circuitry and components described above as a redundant means for powering computing devices 1102A-1102N as well as for providing communication means between the computing devices.

Turning to FIG. 12, a block diagram of a computing device 1200 is shown according to one implementation of the disclosure presented herein. Although the block diagram is simplified and contains blocks that could be combined, it should be understood that blocks could be further combined and expanded without limiting the scope of the implementation described herein. FIG. 13 shows a simplified circuit diagram illustrating one implementation of the computing device 1200 shown in FIG. 12. The computing device shown in FIG. 12 contains an AC terminals connector 1202 having a phase terminal 1204, a ground terminal 1206, and a neutral connector 1208 for connections to the corresponding terminals from the power supply 1106.

The AC terminals connector 1202 provides AC to an isolation component 1210 that isolates the system 1218 from the electrical circuit 1104. It should be understood that the system 1218 may include any of the components of the computing device 100 as described above with respect to FIG. 1. The system 1218 may include the CPU 104, the peripheral interface components 109, ROM 107, and RAM 108. The computing device 1200 may additionally or alternatively include a touch screen 904 or other user input interface. The system 1218 may also include the PoE circuitry and associated components described above for powering the computing device 1200 and providing communications means via an Ethernet connection as a back-up to or an alternative to the electrical circuit 1104. AC is provided to a bridge rectifier 1212 for converting the AC to Direct Current (DC) suitable for the various components of the computing device 1200. DC is provided to a decoupling component 1214 for supplying the computing device 1200 with current during periods of high current demand. DC is provided to the regulator 1216, which in turn provides the necessary DC to the system components 1218. The regulator 1216 contains one or more semiconductor components necessary to change the voltage outputted by the decoupling component 1214 to voltages suitable for the various components of the system components 1218. Voltages needed to drive common electronic components are 5V, 3.3V, 1.8V and 1.5V, but other custom voltages could be utilized by the system components 1218.

The computing device 1200 injects data from the system 1218 into a power signal for transmittal to another computing device using a digital-to-analog converter (DAC) 1220 and a power injector 1222. The DAC 1220 converts digital code from the system 1218 into an analog signal for injecting into the AC power signal. The power injector 1222 injects the analog signal from the DAC 1220 into the AC signal for transmission over the electrical circuit 1104. Since the signal is generated from a DAC, it can be generated as any arbitrary waveform or a conventional waveform, such as a sine-wave of a particular frequency with constant of varying amplitude (AM), frequency modulated constant amplitude (FM), or a modulated signal. The signal injected may be any shape and represent any pattern as generated by the DAC 1220. One implementation may include a waveform of a video pattern that is compressed and superimposed on the electrical circuit 1104 at a particular location relative to the peak amplitude of the 50 Hz or 60 Hz AC waveform. Another waveform representing an audio-signal is superimposed at a particular location on the AC waveform away from the video waveform. In this fashion, a multitude of video, audio, phone, data, and other signals could be transmitted and received over the electrical circuit 1104.

To receive data from the electrical circuit 1104, the computing device 1200 utilizes a voltage limiter 1224 and an analog-to-digital converter (ADC) 1226. A digital code is transmitted from the ADC 1226 to the system 1218 that represents the analog value read at the input of the ADC 1226. The voltage limiter 1224 converts the high amplitudes of the electrical AC-signal into a level that is readable by the ADC 1226 so that conventional components can be used for the ADC 1226 without damaging it. In its simplest form, the voltage limiter 1224 could be a pair of resistors (1308A and 1308B) configured as a voltage divider, where the input voltage peaks at the AC-line voltage, and resistor values are selected so that the output of the voltage divider peaks below the highest tolerable voltage input range for the ADC. Another implementation of the voltage limiter 1224 could include a high-pass filter, where the dominant AC line frequency component would be rejected by the filter, but higher frequencies would pass through. It should be understood that the data receiving and transmission means for reading and writing data from and to the electrical circuit 1104 are not limited to the components shown in FIG. 12 and described with respect to FIG. 13. Rather, any means known by those with skill in the art for receiving data injected into an AC signal and for injecting data into and AC signal may be used in conjunction with the computing device 1200 without limiting the scope of this disclosure.

Turning now to FIG. 13, a simplified circuit diagram 1300 will be described for effectuating the computing device components described above with respect to FIG. 12. The circuit diagram 1300 includes the power source 1106 that supplies power and data to the system 1218. Capacitors 1302A and 1302B provide the isolation component 1210 for isolating the computing device 1200 from the electrical circuit 1104. The bridge rectifier 1212 includes four diodes, 1304A-1304D, for converting the AC signal to a DC signal. A capacitor 1306 provides the decoupling component 1214. The resulting DC signal is passed to the regulator 1216, which provides the necessary DC to the system 1218.

The capacitors 1302A and 1302B, serving as the isolation component 1210, naturally have the ability to block DC voltage from passing through the component. However, voltages that fluctuate will pass through a capacitor at a magnitude depending on the frequency of the fluctuations. A low frequency waveform in the low Hertz (Hz) range, such as the AC line voltage at 50 or 60 Hz, will pass through a capacitor, but not readily since the frequency is relatively low. However, high frequencies such as those injected and received by the ADC 1226 and DAC 1220 can more readily pass through a capacitor, especially if the frequency is substantially high.

Circuits powered from AC signals may contain a transformer. The purpose of this transformer is to electrically isolate the equipment from the power-line voltages itself, as well as to reduce the voltage to a level acceptable for input to the rest of the circuit in the application. By using capacitors 1302A and 1302B on both the phase terminal 1204 and the neutral connector 1208 of the AC terminals connector 1202, the disclosure provided herein achieves both the isolation of the voltage as well as a reduction in the voltage supplied since the capacitor operates poorly in the low-frequency range. The capacitors 1302A and 1302B will also serve as a current limiting device, since the amount of current allowed through each capacitor is limited to the amount of charge that each capacitor can hold. The exact amount of charge each capacitor 1302A and 1302B can hold is again a function of the size of the capacitor and is measured in Farad (F). A circuit that needs more charge passing through needs a capacitor of higher Farad-value. Thus, this type circuit could eliminate the need for fuses as circuit protection, as the capacitors 1302A and 1302B naturally serve as current limiters.

Data is provided from the system 1218 to the DAC 1220. The digital code is converted to an analog signal, which is provided to the power injector 1222 for injecting into the AC signal. According to one implementation, the power injector includes capacitors 1310A and 1310B, resistors 1312A and 1312B, and field-effect transistors (FETs) 1314A and 1314B. The resistors 1312A and 1312B set up the biasing of the FETs 1314A and 1314B, or simply disables the FETs from turning on. Turning on the FETs 1314A and 1314B according to one implementation means allowing current to flow through source and drain terminals of the computing device 1200. The amount of current flowing through each FET is controlled by the voltage applied across a third terminal called the gate and the source terminal. By varying the voltage at the gate, the amount of current through it will vary, thus controlling what could be a high current by the means of a small variation in voltage. The isolation capacitors 1310A and 1310B block the DC-signal from turning on the FETs 1314A and 1314B, so that only changes in voltage will cause the FETs 1314A and 1314B to conduct current. In this way, the same source, which in this implementation is the DAC 1220, can control both the FETs 1314A and 1314B with a single source, and because of their arrangement in the circuit, the voltages controlling the FETs 1314A and 1314B are complimentary. The voltage out of the DAC 1220 may be held at a mid-level. When the voltage increases out of the DAC 1220, the voltage across the source and gate increases, and the FET 1314A is turned on proportional with the change. During this time, a negative charge is applied across the other FET 1314B, in which case it will not turn on. Analogously, if the voltage decreases out of the DAC 1220, the voltage across the gate and source of the FET 1314B increases in negativity, and will cause it to turn on proportional with the change in the voltage out of the DAC 1220. In this fashion, the DAC 1220 can convert an arbitrary waveform out on the gates of the FETs 1314A and 1314B that in turn causes a current to flow in and out of the AC signal of the electrical circuit 1104 which is proportional to the amplitude of the waveform.

As stated above, it should be understood that the data receiving and transmission means for reading and writing data from and to the electrical circuit 1104 are not limited to the components described herein.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An in-wall computing device for providing processing capabilities and power-line networking capabilities, comprising:
   a Central Processing Unit (CPU);
   a power connector operative to receive an Alternating Current (AC) signal from a power source on an electrical circuit;
   internal data injection circuitry operative to receive outgoing data from the CPU and to inject the outgoing data into the AC signal;
   a motion sensor operative to detect a plurality of proximities of an object or person from the in-wall computing device and to trigger the CPU to execute a plurality of events, each event corresponding to a detected proximity; and
   a housing encompassing the CPU, the power connector, the motion sensor, and the internal data injection circuitry, wherein the housing is configured for installation within an electrical wall box that is disposed substantially within a wall, and wherein the plurality of events comprises a first event at a first proximity and a second event at a second proximity that is different from the first proximity.

2. The in-wall computing device of claim 1, further comprising internal data receiving circuitry operative to extract incoming data from the AC signal and to supply the incoming data to the CPU.

3. The in-wall computing device of claim 2, wherein the internal data receiving circuitry comprises a voltage limiter and an analog-to-digital converter.

4. The in-wall computing device of claim 1, further comprising a user interface for receiving user commands, wherein the internal data injection circuitry is operative to translate the user commands into an analog signal compatible for injection into the AC signal and to inject the translated user commands into the AC signal for transmission to a receiving computing device on the electrical circuit.

5. The in-wall computing device of claim 4, wherein the user interface comprises a touch sensitive display unit.

6. The in-wall computing device of claim 5, wherein the display unit comprises a backlight and wherein the CPU is operative to control the color and intensity of the backlight.

7. The in-wall computing device of claim 1, wherein the internal data injection circuitry comprises a digital-to-analog converter and a power injector.

8. The in-wall computing device of claim 1, further comprising internal power supply circuitry operative to receive the AC signal from the power connector, to convert the AC signal into a Direct Current (DC) signal, and to supply the DC signal to the CPU.

9. The in-wall computing device of claim 8, wherein the internal power supply circuitry comprises an isolation component, a rectifying component, and a regulator component.

10. The in-wall computing device of claim 8, further comprising an Ethernet connector operative to receive power independently of the power connector and to communicate data between the in-wall computing device and one or more network computing devices communicatively linked to the in-wall computing device, wherein the internal power supply circuitry is operative to extract power from the Ethernet connector.

11. An in-wall computing device for providing processing capabilities and power-line networking capabilities, comprising:
a CPU;
a power connector operative to receive an AC signal from a power source;
internal data receiving circuitry operative to extract incoming data from the AC signal and to supply the incoming data to the CPU;
one or more peripheral ports for connection to one or more peripherals; and
a housing encompassing the CPU, the power connector, and the internal data receiving circuitry, wherein the housing is configured for installation within an electrical wall box disposed substantially within a wall and comprises
a front plate having a protruding portion configured to fit within an opening of a finishing wall plate, and
a plurality of ventilation ridges disposed at an edge of the protruding portion, the ventilation ridges configured to provide an air passageway from a front surface of the front plate to the internal power supply circuitry and the CPU behind the front plate, and
a display unit having a touch sensitive surface for receiving user input,
wherein the one or more peripheral ports are exposed in the housing and accessible from a front side of the in-wall computing device when installed within the electrical wall box.

12. The in-wall computing device of claim 11, further comprising internal data injection circuitry operative to receive outgoing data from the CPU and to inject the outgoing data into the AC signal.

13. The in-wall computing device of claim 12, wherein the internal data injection circuitry comprises a digital-to-analog converter and a power injector.

14. The in-wall computing device of claim 11, wherein the internal data receiving circuitry comprises a voltage limiter and an analog-to-digital converter.

15. The in-wall computing device of claim 11, further comprising internal power supply circuitry operative to receive the AC signal from the power connector, to rectify the AC signal to a DC signal, and to supply the DC signal to the CPU.

16. A system for controlling peripheral devices, the system comprising:
a first in-wall computing device, wherein the first in-wall computing device comprises
a touch sensitive screen comprising a screen connector,
a first CPU, wherein the first CPU is operative to receive data from the touch sensitive screen,
a first power connector operative to receive an AC signal from a power source on an electrical circuit,
internal data injection circuitry operative to receive the data from the first CPU and to inject the data into the AC signal for transmission to a second in-wall computing device, and
a first housing encompassing the first CPU, the first power connector, the first internal data injection circuitry, wherein the first housing comprises a front surface comprising only an input device connector coupled to the CPU and configured for mating with the screen connector, and wherein the first housing is configured for installation within a first electrical wall box disposed substantially within a wall; and
the second in-wall computing device, wherein the second in-wall computing device includes
a second power connector operative to receive the AC signal from the power source on the electrical circuit,
internal data receiving circuitry operative to extract the data transmitted within the AC signal from the first in-wall computing device and to supply the data to a second CPU,
the second CPU, wherein the second CPU is operative to receive the data from the internal data receiving circuitry and to transmit instructions corresponding to the data to one or more peripheral ports for transmission to one or more peripherals, and
a second housing encompassing the second CPU, the second power connector, the internal data receiving circuitry, and the one or more peripheral ports, wherein the second housing is configured for installation within a second electrical wall box disposed substantially within a wall and comprises a front plate having a protruding portion configured to fit within an opening of a finishing wall plate.

17. The system of claim 16, wherein the first in-wall computing device further comprises a first Ethernet connector operative to receive power independently of the first power connector and to communicate the data between the first in-wall computing device and the second in-wall computing device, and wherein the second in-wall computing device further comprises a second Ethernet connector operative to receive power independently of the second power connector and to communicate the data between the first in-wall computing device and the second in-wall computing device.

18. The in-wall computing device of claim 1, wherein the plurality of events comprise at least one of turning on a light, turning on a stereo, and turning on a television.

19. The in-wall computing device of claim 1, wherein the second event is different from the first event.

* * * * *